United States Patent [19]

Porter

[11] 4,426,832
[45] Jan. 24, 1984

[54] HARVESTING MACHINE SHAKER SYSTEM

[75] Inventor: John R. Porter, Waterloo, N.Y.

[73] Assignee: Porter-Way Harvester Mfg. Co. Inc., Waterloo, N.Y.

[21] Appl. No.: 336,117

[22] Filed: Dec. 31, 1981

[51] Int. Cl.³ .......................... A01D 17/00; B07B 1/10
[52] U.S. Cl. .................................. 56/327 R; 171/14; 171/27; 209/308
[58] Field of Search ................. 56/327 R; 171/14, 27, 171/127; 209/665, 625, 308

[56] References Cited

U.S. PATENT DOCUMENTS

| | | | |
|---|---|---|---|
| 3,810,512 | 5/1974 | Porter | 171/14 |
| 4,174,755 | 11/1979 | Siri | 56/16.5 |
| 4,262,750 | 4/1981 | Merkley et al. | 56/327 R |

Primary Examiner—Robert Peshock
Assistant Examiner—John Weiss
Attorney, Agent, or Firm—Charles S. McGuire

[57] ABSTRACT

The upper run of a tomato harvester shaker chain is oscillated by a plurality of rotating arms which contact the chain along each side. Each arm is driven by a separate hydraulic motor, alternate motors along each side, and the motors driving the arms directly opposite one another on the two sides, being of different size or capacity to provide varying oscillatory speeds both along and across the chain. The motors along the two sides of the chain are connected in separate hydraulic series circuits, the flow rate through each circuit, and hence the speed of the motors thereof, being selectively controlled by variable speed control valves. Also, a hydraulic flow divider is preferably provided in the line between the pump and hydraulic motors to supply different proportions of the total flow to the groups of motors in each series circuit.

7 Claims, 4 Drawing Figures

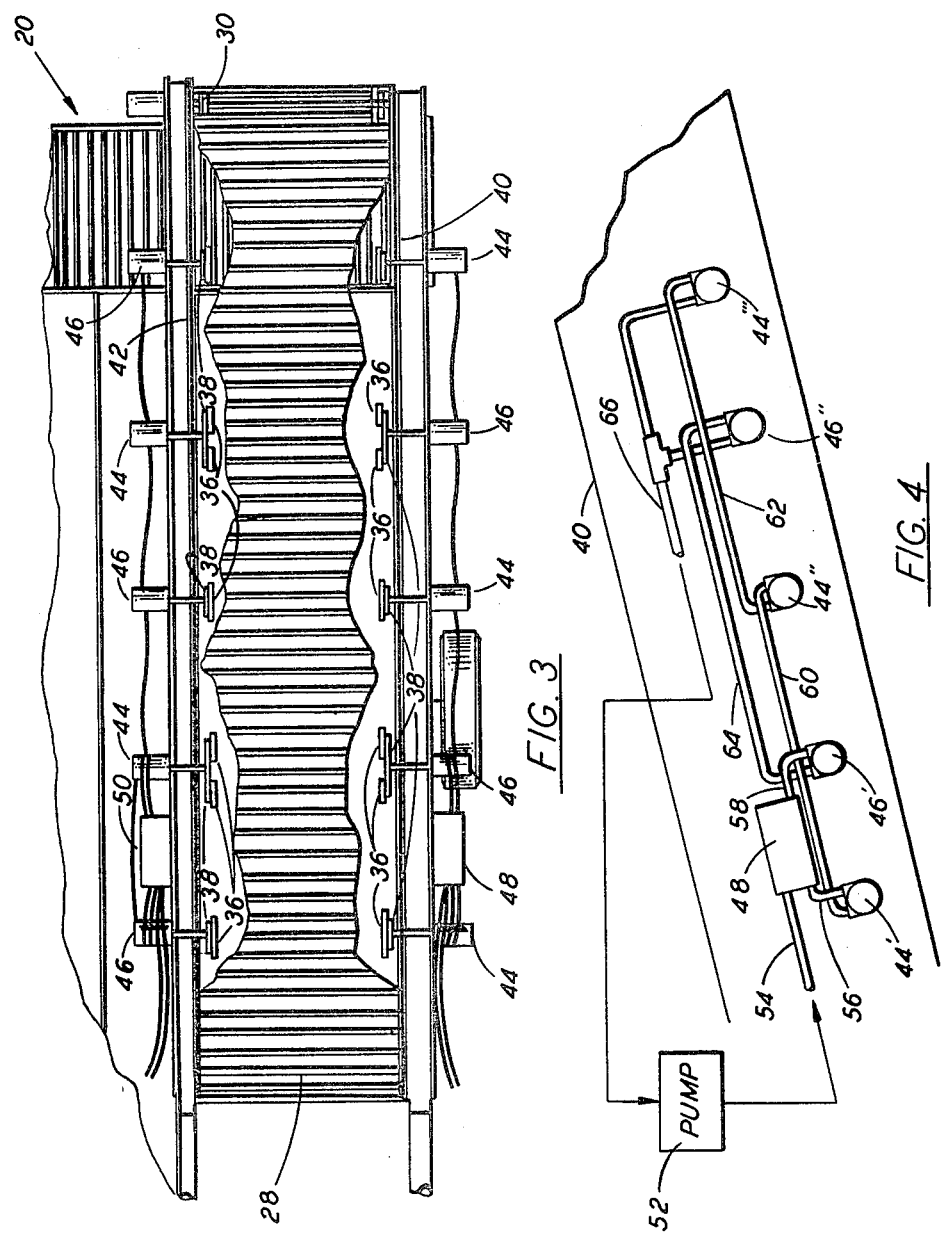

HARVESTING MACHINE SHAKER SYSTEM

BACKGROUND OF THE INVENTION

The present invention relates to harvesting machinery drive systems, and more particularly to hydraulic drive systems for machines which separate crops from vines by shaking action.

In the large-scale harvesting of tomatoes, it has been a common practice for many years to employ machinery wherein a mass of vines and tomatoes is fed to an oscillating shaker conveyor which shakes the crop loose and allows it to pass through the shaker chain to be recovered as the vines are discarded back into the field. Early patents disclosing vertical oscillation of travelling shaker chains include U.S. Pat. Nos. 1,107,765 of Klinghammer, 2,711,742 of Lavern and 3,106,249 of Zachery. Improvements in the shaker mechanism and drive as specifically applied to the harvesting of tomatoes are disclosed in numerous other patents such as U.S. Pat. Nos. 3,071,196 of Scheidenhelm, 3,301,331 of Looker, et al, and 3,633,677 of Walker.

U.S. Pat. No. 3,810,512 relates to further improvements in such harvesting apparatus employing a plurality of rotating arms along each side of the shaker belt. The arms carry rollers on each end for contacting the lower side of the upper run of the chain. Alternate arms along each side are arranged at 90° to one another; that is, when the rotational position of each arm is prependicular to the direction of chain travel and thus lifting the chain to the maximum extent, the adjacent arms (or arm, in the case of the endmost arms) are positioned parallel to the direction of chain travel. This rotational relationship is maintained by providing a sprocket on each arm, connection all sprockets along each side by drive chains and imparting rotation from a master sprocket driven by a single hydraulic motor.

It is a principal object of the present invention to provide a drive system for the oscillating machanism of a tomato harvester shaker chain which improves the operating efficiency of the harvester.

Another object is to provide a tomato harvester wherein the speed of various groups of driving mechanism may be individually and selectively controlled to achieve improved operating efficiency.

A further object is to provide a hydraulic drive system for a tomato harvester which enhances the ability of the shaker chain to remove the crop from the vine, thereby allowing faster operating speeds and harvesting a greater amount of crop in less time than is normally achieved with present harvesters.

Other objects will in part be obvious and will in part appear hereinafter.

SUMMARY OF THE INVENTION

In accordance with the foregoing objects, the harvesting machine of the invention includes a shaker belt to which oscillatory motion is imparted by a plurality of rotating arms, each driven by an individual hydraulic motor. There is no physical connection between the arms, which are arranged in two rows, one along each side of the upper run of the chain. The motors of each row of arms are connected in separate hydraulic series circuits. Alternating motors in each row, and the motors positioned directly across from one another on opposite sides of the chain, are of different size or capacity and therefore operate at different speeds.

Other hydraulic motors which drive various moving portions of the harvesting machine are connected in the circuits of the shaker arm motors, as well as in additional, separate circuits. A variable speed control valve is provided in each hydraulic circuit to provide a full and continuous range of control from zero to full speed. The valves may be selectively set by an operator to give the best combination of operating speeds of the various circuits to optimize the operating efficiency of the machine, under various harvesting conditions.

BRIEF DESCRIPTION OF THE DRAWINGS

FIG. 3 is a fragmentary plan view, partly in section, on the line 3—3 of FIG. 2; and FIG. 4 is a side elevational view of the portion of the machine shown in FIG. 3, showing the hydraulic circuits employed in driving portions of the harvesting machine.

DETAILED DESCRIPTION

Figure 1:
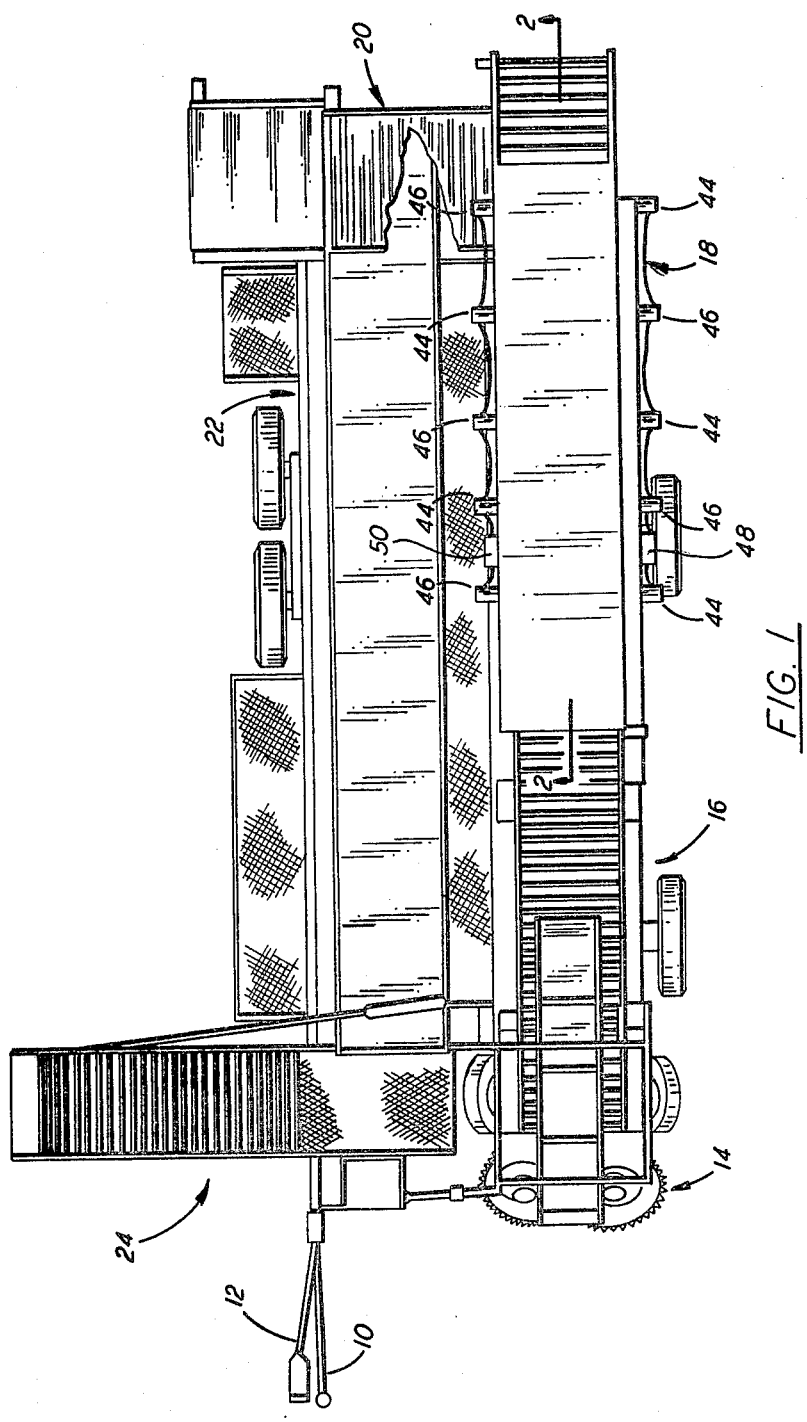
FIG. 1 is a plan view of a tomato harvesting machine constructed in accordance with the invention, with portions broken away.

Referring now to the drawings, in FIG. 1 is shown a tomato harvesting machine having tongue 10 extending from the main frame for attachment to a tractor draw bar, and drive shaft 12 for attachment to the usual power take-off unit on the tractor for transmitting power to the harvester hydraulic system. As explained later in more detail, mechanism with which the present invention is directly concerned, as well as other portions of the harvesting machine, are driven by hydraulic motors which receive pressurized fluid from pumps powered in conventional fashion by the tractor power take-off unit.

The harvesting machine is comprised generally of header section 14, upright feed section 16, shaker section 18, rear lateral conveyor 20, sorting section 22, and discharge section 24. Details of construction and operation of all elements of the harvester, excepting those of the present invention, may be found in prior U.S. Pat. Nos. 3,810,512, 3,999,613 and 4,234,045. The present invention is concerned with the operation of portions of shaker section 18, wherein the vines and crop are moved along an oscillating chain which serves to dislodge the crop which falls through spaces in the shaker chain to be caught on another chain, with more closely spaced links, and eventually transported to discharge section 24 and ejected from the machine.

Figure 2:
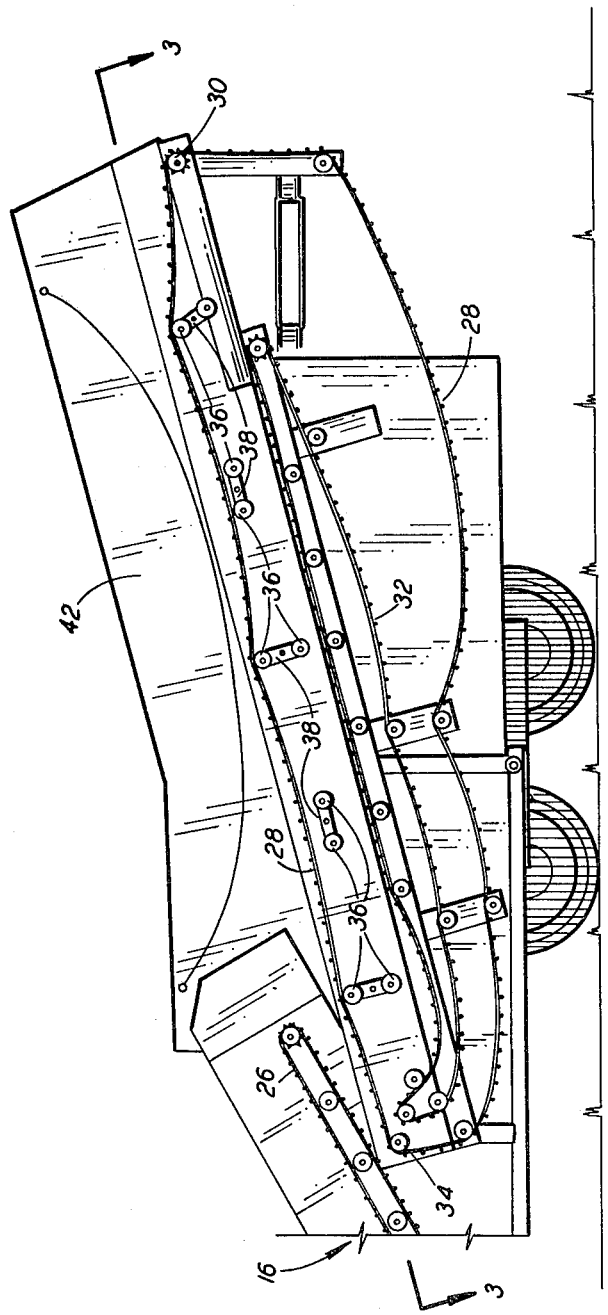
FIG. 2 is a fragmentary side, elevational view in section on the line 2—2 of FIG. 1.

Operation of shaker section 18, with which the present invention is concerned, is seen more clearly with reference to FIGS. 2 and 3. Tomato plants with fruit attached, and some loose tomatoes which may already have been detached from the plants, are discharged from the upper end of continuous chain 26 of upright feed section 16 to fall upon shaker chain 28 of shaker section 18. Chain 28 is guided in a continuous loop by suitable sprockets or rollers, including drive sprocket 30 which is powered by a hydraulic motor receiving pressurized fluid from the aforementioned pump. Shaker chain 28 completely encircles fruit chain 32 which is likewise drive in a continuous loop having upper and lower runs. The parallel links of shaker chain 28 are spaced more widely than the largest nominal dimension of tomato to be harvested by the machine, whereby tomatoes which are separated from the plants may fall through the upper run of chain 28. The links of fruit chain 32, on the other hand, are spaced more closely than the smallest diameter of tomato to be harvested, whereby fruit falling through shaker chain 28 is caught and retained on the upper run of fruit chain 32 and discharged from the upper end thereof onto rear lateral conveyor 20 for transport to sorting section 22 and eventual discharge from the harvesting machine via discharge section 24.

The mechanism thus far described, including the rollers mounted on rotating arms for imparting the shaking movement to the chain, is the same in all material respects as that of U.S. Pat. No. 3,810,512. In the prior patent, however, direct drive was provided for only one arm on each side of the shaker section, all of the other arms being connected to the driven arm by chain and sprocket arrangements. It has been found that efficiency of the shaking operation, i. e., completeness of removal of fruit from the plants, particularly with new varieties of tomatoes which are more difficult to release from the plants, is enhanced by driving each arm independently by a drive system such as that described in the following paragraphs.

Shaker section 18 is enclosed on both sides by vertical walls 40 and 42, of suitable guage sheet metal, between which chains 28 and 32 are supported. Five hydraulic motors are mounted upon each of walls 40 and 42, with their output shafts extending through the walls. The motors are of two different sizes, mounted alternately along each side. All motors of the first size, e. g., ½", are denoted by reference numeral 44 and those of the second size, e. g., ¼", are numbered 46. Thus, the two outside and center motors mounted on wall 40 are ½" hydraulic motors, while the motors between the center and outside motors are ¼". The opposite arrangement is used with the motors mounted on wall 42, the two outside and center motors being of the ¼" size, and the other two being ½". Motors 44 and 46 are evenly spaced along walls 40 and 42, one motor on each side being directly opposite a motor on the other side. It will be seen that the motors of each opposite pair are of different sizes, as well as the successive motors along each side. Arms 38 are mounted upon the output shafts of motors 44 and 46 on the insides of walls 40 and 42.

A further preferable feature of the invention is the provision of a positive displacement flow dividing or proportionating apparatus in the hydraulic line between the pressurizing pump and motors 44 and 46. Such apparatus is commercially available in various sizes, displacements (gallons per revolution), numbers of sections and maximum inlet gallons per minute, from Mechanical Tool and Engineering Co. of Rockford, Ill., for example, under the designation "Proportionator." Proportionators 48 and 50 are mounted upon walls 40 and 42, respectively, and each is connected to the output of the pump, indicated diagrammatically in FIG. 4 at 52. Proportionators 48 and 50 are identical, two-section units which receive a single input from pump 52 and divide the flow into two proportionate circuits, e. g., ⅜ to motors 46 and ⅝ to motors 44.

The hydraulic connections for the elements mounted on wall 40 are shown in FIG. 4, those on the other side of the shaker section being identical. Pressurized fluid is delivered from pump 52 to proportionator 48 via line 54. The output from one section of proportion 48, e.g., ⅝ of the flow, is delivered through line 54 to the input side of motor 44'; the output from the other section is connected be line 58 to the input side of motor 46'. The outlet side of motor 44' is connected by line 60 to the input of motor 44", which in turn is connected from its outlet to the input of motor 44'" by line 62. The outlet side of motor 46' is connected by line 64 to the input of motor 46". The output sides of motors 44'" and 46" are connected back to pump 52 by line 66. It is possible to use a single proportionator having outputs connected to motors on both sides of the shaker section, to have hydraulic motors driving other portions of the harvesting machine connected in the circuits of the motors driving the shaker arms, to provide adjustable flow control valves for selectively varying the speed of the motors in a given hydraulic circuit, and other such modifications, within the scope of the invention. It will also be understood that any sizes, proportions, etc. set forth herein are for illustrative purposes only and should not be considered as limiting the scope of the invention.

What is claimed is:

1. A shaker system for separating tomatoes, and like crops, from vines in a harvesting machine, said system comprising, in combination:
    (a) a continuous conveyor chain having parallel links spaced more widely than the largest nominal diameter of crops being harvested;
    (b) means for driving said chain in a continuous loop having upper and lower runs; and
    (c) means for imparting oscillatory, shaking movement to said upper run, the speed and magnitude of said movement being sufficient to dislodge the crops from the vines, said movement imparting means comprising:
        (i) a plurality of arms each carrying a chain-engaging roller on the ends thereof;
        (ii) means supporting said arms beneath the upper run of said chain for rotation about their centers in two rows each including the same number of arms, said rows being spaced by a distance slightly less than the width of said chain, whereby said upper run of chain is supported along its marginal edges and oscillated transversely to the direction of movement in said continuous loop by rotation of said arms;
        (iii) each of said arms being connected to and rotated by an individual hydraulic motor, the motors connected to successive arms in each of said rows being of different capacity; and
        (iv) means supplying hydraulic fluid under pressure to said motors to drive the latter at predetermined speeds.

2. A shaker system for separating tomatoes, and like crops, from vines in a harvesting machine, said system comprising, in combination:
    (a) a continuous conveyor chain having parallel links spaced more widely than the largest nominal diameter of crops being harvested;
    (b) means for driving said chain in a continuous loop having upper and lower runs; and
    (c) means for imparting oscillatory, shaking movement to said upper run, the speed and magnitude of said movement being sufficient to dislodge the crops from the vines, said movement imparting means comprising:
        (i) a plurality of arms each carrying a chain-engaging roller on the ends thereof;

(ii) means supporting said arms beneath the upper run of said chain for rotation about their centers in two rows each including the same number of arms, said rows being spaced by a distance slightly less than the width of said chain, whereby said upper run of chain is supported along its marginal edges and oscillated transversely to the direction of movement in said continuous loop by rotation of said arms;

(iii) each of said arms being connected to and rotated by an individual hydraulic motor;

(iv) said arms of said two rows being equal in number and arranged in laterally opposite pairs, said motors connected to the two arms of each pair being of different capacity; and (v) means supplying hydraulic fluid under pressure to said motors to drive the latter at predetermined speeds.

3. A shaker system for separating tomatoes, and like crops, from vines in a harvesting machine, said system comprising, in combination:

(a) a continuous conveyor chain having parallel links spaced more widely than the largest nominal diameter of crops being harvested;

(b) means for driving said chain in a continuous loop having upper and lower runs; and (c) means for imparting oscillatory, shaking movement to said upper run, the speed and magnitude of said movement being sufficient to dislodge the crops from the vines, said movement imparting means comprising:

(i) a plurality of arms each carrying a chain-engaging roller on the ends thereof;

(ii) means supporting said arms beneath the upper run of said chain for rotation about their centers in two rows each including the same number of arms, said rows being spaced by a distance slightly less than the width of said chain, whereby said upper run of chain is supported along its marginal edges and oscillated transversely to the direction of movement in said continuous loop by rotation of said arms;

(iii) each of said arms being connected to and rotated by an individual hydraulic motor;

(iv) means supplying hydraulic fluid under pressure to said motors to drive the latter at predetermined speeds; and (v) positive displacement flow dividing apparatus interposed between said means supplying hydraulic fluid under pressure and the inlet sides of said hydraulic motors, said flow dividing apparatus directing first and second differing portions of said fluid to first and second groups, respectively, of said motors.

4. The invention according to claim 3 wherein said first and second groups of motors are of two different capacities.

5. The invention according to claim 4 wherein said first and second groups of motors comprise alternately positioned motors in each of said two rows.

6. The invention according to claim 5 wherein said arms of said two rows are equal in number and arranged in laterally opposite pairs, said motors connected to the two arms of each pair being of opposite ones of said first and second groups.

7. The invention according to claims 1, 2 or 3 and further including a pair of vertical wall members between which at least a portion of said chain is moved in said continuous loop, said motors being mounted upon the outside of said walls with their output shafts extending through said walls, and said arms being mounted upon said output shafts on the insides of said walls.

* * * * *